June 15, 1943. M. W. BEARDSLEY 2,321,791
PISTON RING GAS SEAL
Filed March 19, 1940 3 Sheets-Sheet 1
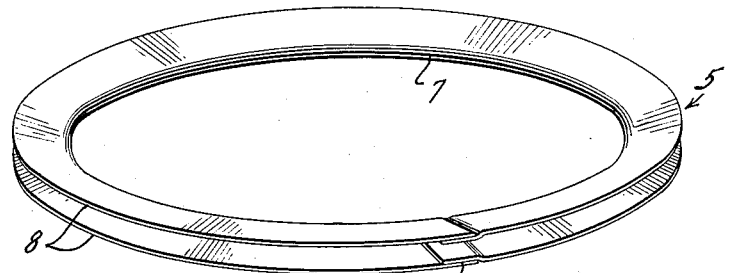
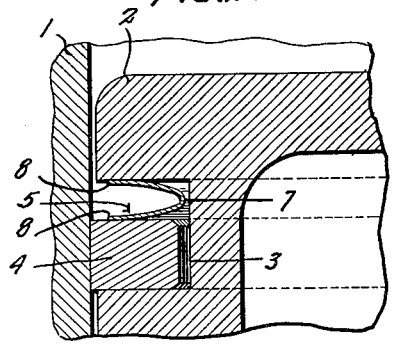
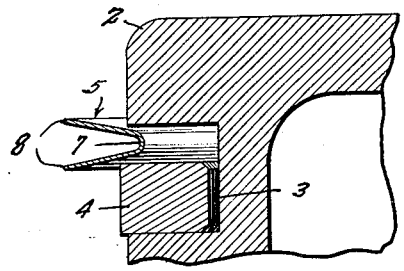
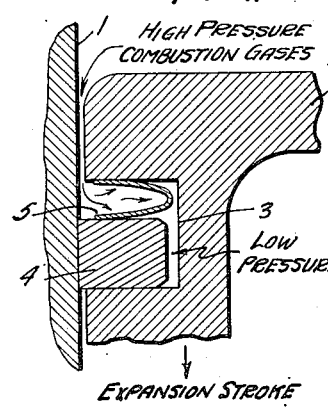
EXPANSION STROKE
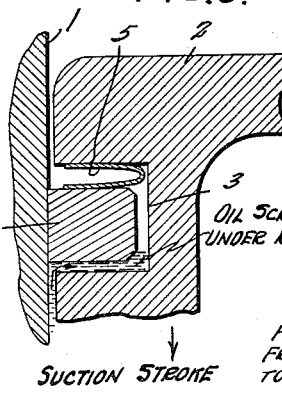
SUCTION STROKE
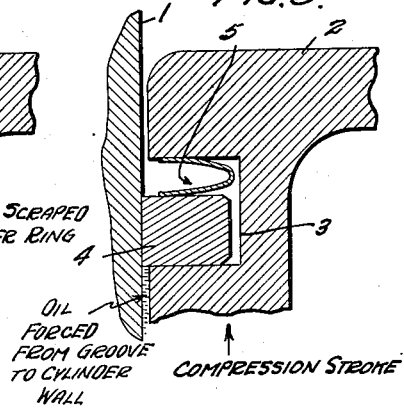
COMPRESSION STROKE
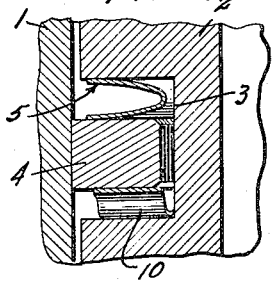
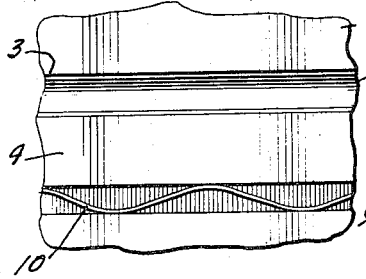
Inventor
MELVILLE W. BEARDSLEY
By
Semmes, Keegin & Semmes
Attorneys FIG. 9.
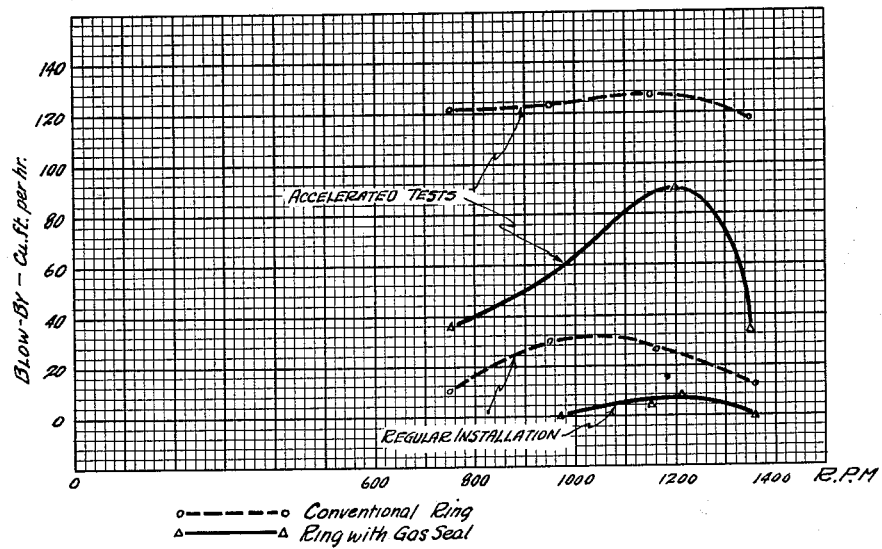
o———o Conventional Ring
△———△ Ring with Gas Seal
FIG. 10.
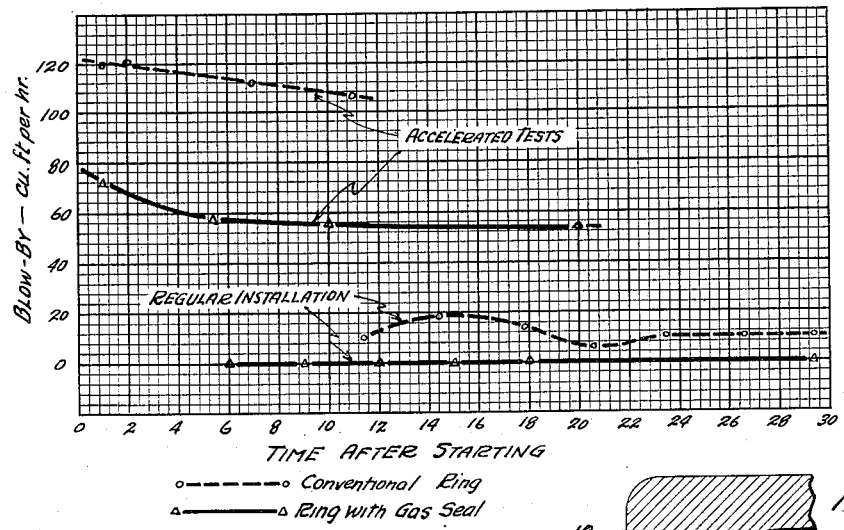
o———o Conventional Ring
△———△ Ring with Gas Seal
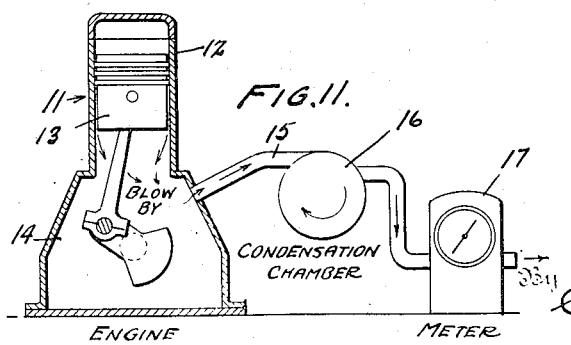
FIG. 11.
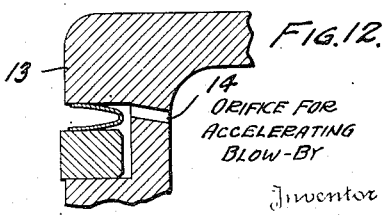
FIG. 12.
ORIFICE FOR ACCELERATING BLOW-BY
Inventor
MELVILLE W. BEARDSLEY
Semmes, Keegin & Semmes
Attorneys June 15, 1943.  M. W. BEARDSLEY  2,321,791
PISTON RING GAS SEAL
Filed March 19, 1940   3 Sheets-Sheet 3

Inventor
MELVILLE W. BEARDSLEY

By Semmes, Keegin & Semmes
Attorneys

Patented June 15, 1943

2,321,791

UNITED STATES PATENT OFFICE 2,321,791

PISTON RING GAS SEAL

Melville W. Beardsley, Atlanta, Ga.

Application March 19, 1940, Serial No. 324,853

2 Claims. (Cl. 309—28)

The present invention in general relates to pistons, and more particularly has reference to means for preventing gases from getting behind the piston ring from the cylinder combustion space and in addition affording lubrication control.

It is well known that much effort is being exercised at the present time to improve the efficiency of internal combustion engines, and particular attention is being paid to the piston rings per se. Beside the primary function of a piston ring, the prevention of gas leakage past the piston, additional attention is directed to minimizing oil consumption and cylinder wear. To maintain its principal purpose of keeping a seal against leakage of gas the conventional ring if manufactured and maintained within close limits of fit, is satisfactory, but to enable the ring to perform functions other than that of maintaining compression, special designs must be resorted to.

While many designs of piston rings have been provided to improve engine performance, practically none of them have proven entirely satisfactory and this may be because the rings are unable to move freely in their grooves and, as a consequence, become choked with carbon and do not function properly. In addition, some of these designs have incorporated a gas sealing means machined into the ring which, in addition to being costly, usually introduces undesirable complications into the internal combustion engine assembly.

With close fitting rings it will be appreciated that the ring must be machined exactly to size to conform to the space available for it between the piston ring and the groove. If such precise machining could be accomplished, a sealing ring would be unnecessary since the ring itself would be machined to effect its own seal in the groove. However, such precision is impracticable.

I have determined that to insure the necessary intimate contact that is necessary when the ring performs its functions effectively, an auxiliary sealing ring may be provided. This sealing ring must be made slightly more expanded between its outer peripheral edges than it will be when installed. The sealing ring when in position will exert a normal force upon the adjacent groove wall and piston ring surface, and this force must not be too great or it will hold the piston ring to its lower seat and thus prevent the ring from having free movement to follow the cylinder wall as the piston reciprocates.

As above pointed out, the problem of leakage of gases behind the piston ring has been appreciated and devices have been devised to try and prevent these gases from getting behind the ring. The disadvantages of using a machined ring have been discussed. However, in addition to the machine type of ring, the use of spring-like members has been proposed, but these particular constructions work on an entirely different principle from that which has been discovered by me. The prior spring members are constructed in such a manner that increased gas pressure lessens the sealing effect by decreasing the normal force between the spring member and either the piston ring or the groove wall. My spring action, however, is increased by the gas pressure and the greater the gas pressure the greater the sealing effect.

An object of my invention is to provide a piston ring gas seal that overcomes the disadvantageous features of those now being used in the art.

Another object of my invention is to provide a piston ring gas seal that, in addition to preventing the gases from getting behind the piston ring, will also afford lubrication control.

Yet another object of my invention is to provide a piston ring gas seal which will give less piston ring and cylinder wear.

Yet a further object of my invention is to provide a piston ring gas seal that will eliminate piston ring sticking and give less blow-by and compression loss.

Another object of my invention is to provide a piston ring gas seal which comprises a ring of heat resistant material that can be easily and cheaply manufactured.

To achieve the foregoing and further objects, my invention comprises installing between the top of the piston ring and the top of the groove, a ring of heat resisting material. The ring is installed with some induced initial stress so that the outer peripheral edges are pressed against the piston ring and the top of the groove. When the high pressure gases leak down from the combustion space above the piston, they tend to open out the sealing ring and press it more firmly to the piston ring and the top of the piston ring groove. Consequently, the ring will afford a seal to prevent the gases from getting behind the piston ring.

The gas pressure and sealing ring stress will hold the piston ring to the bottom of its groove during the expansion stroke. During the exhaust stroke, friction and the sealing ring stress will hold the piston ring to the bottom of its groove, On the suction stroke, friction and suction pressure tend to raise the piston ring to the top of the groove while the initial stress of the sealing ring at the same time tends to keep the piston ring to the bottom of the groove. The initial stress in the sealing ring should be such that the piston ring will rise off its seat slightly during the suction stroke and tend to act as an oil scraper ring.

With the use of the ring covered in this application, many advantageous features are afforded. In the first place, there will be less friction loss because high gas pressure cannot get behind the piston ring, and as a result it is not pressed so strongly against the cylinder wall. In the second place, there will be less piston ring and cylinder wear due to the reasons just mentioned and because of the lubrication control. In the third place, there is an elimination of piston ring sticking since the high temperature and pressure gases are sealed out from behind the ring and the lubricating oil is not "cracked" and carbonized. Also, the piston ring moves up and down in its groove and the oil is not allowed to collect and gum up. In the fourth place, there is less blow-by and compression loss as the gases cannot escape behind the piston ring and the ring remains free so that it can better perform its purpose of preventing the gases from escaping between the piston and the cylinder wall.

I have also found that positioning a band spring under the piston ring will materially prevent piston ring and cylinder wear. This appears to be due to the fact that on the expansion stroke when the piston ring is pressed down, the oil under the ring is forced out to the cylinder wall and lubricates the ring and cylinder contact throughout the stroke.

In the drawings in which like numerals indicate the same or similar parts:

Figure 1 is a view in perspective of my piston ring gas seal.

Figure 2 is a fragmental sectional view showing the gas seal in its installed position between the piston ring and the groove.

Figure 3 is a view similar to Figure 2, showing the gas seal before it is positioned between the groove and the ring.

Figure 4 is a view similar to Figure 2, showing the relation of the parts during the expansion stroke.

Figure 5 is a view similar to Figure 2, showing the position of the parts during the suction stroke.

Figure 6 is a view similar to Figure 2, showing the position of the parts during the compression stroke.

Figure 7 is a fragmental sectional view showing a modification of the form shown in Figure 1 in which a band spring is disposed below the piston ring.

Figure 8 is a fragmental view in front elevation of the piston shown in Figure 7.

Figure 9 is a graph of the blow-by in cubic feet per hour plotted against the revolutions per minute.

Figure 10 is a graph of the blow-by in cubic feet per hour plotted against the time after starting.

Figure 11 is a diagrammatic representation of a test set up for obtaining the data shown in Figures 9 and 10.

Figure 12 is a fragmental sectional view showing the type piston used in the accelerated tests plotted in Figures 9 and 10.

Figure 13:
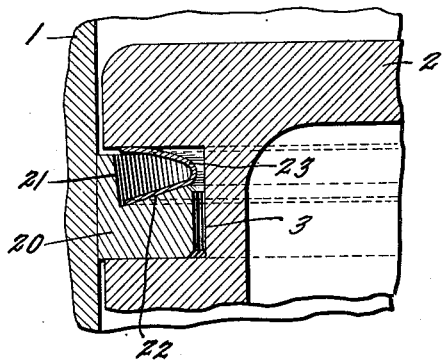
Figure 13 is a fragmental sectional view showing a modified type of gas seal ring that can be used.

In the drawings and more particularly Figures 1 and 2, I have shown a cylinder wall 1 having mounted for movement therein piston 2 provided with piston ring groove 3 and piston ring 4. Mounted above the piston ring 4 and the side wall of the groove 3 is my novel gas seal designated 5.

The gas seal 5 is preferably made of a heat resisting material formed out of thin sheet stock. As above pointed out, most of the rings of this character have been machined, and I frankly feel that the use of material such as herein set forth is the only practical manner in which a sealing ring having the necessary characteristics can be provided. It will be noted that the seal 5 is substantially circular in configuration and approximately V-shaped in cross section. The ends of the seal 5 can be joined, as shown at 6, although other types of union can be resorted to.

In Figures 2 and 3, it will be observed that apex 7 of the seal 5 is adapted to extend to a point adjacent the inner wall of the groove 3 and outer peripheral edges 8 are slightly more expanded than will be the case when the ring 5 is installed. Consequently, when the ring is put in place, it will exert a normal force upon the adjacent groove wall and the piston ring surface. I have determined that this normal force must not be too great or it will hold the piston ring to its lower seat and prevent the piston ring from having free movement to follow the cylinder wall as the piston reciprocates.

In operation, attention is called to Figures 4–6 inclusive, wherein it will be noted that the gas pressure and sealing stress will hold the piston ring to the bottom of its groove 3 during the expansion stroke. On the suction stroke (Figure 5), friction and suction pressure tend to raise the piston ring to the top of its groove while the initial stress of the seal 5 tends to still keep the piston ring to the bottom of the groove. It should be brought out at this time that the initial stress in the seal 5 should be such that the piston ring 4 will rise off its seat slightly during the suction stroke and tend to act as an oil scraper ring causing oil on the cylinder wall to flow under the piston ring. However, on the compression stroke, it will be seen that the oil will be forced from the groove 3 to the cylinder wall to lubricate the ring and cylinder for the entire piston stroke. On this stroke also, the sealing ring functions to reduce compression losses.

In Figure 7, I have shown a somewhat similar construction to that depicted in Figures 1–6 inclusive, but in this particular embodiment, I use a band spring 10 disposed beneath the piston ring 4. At rest, the piston ring 4 will assume an intermediate position in the groove 3 which will be determined by the initial stress in the seal 5 and in the band spring 10. On the expansion stroke, the gases are sealed from behind the piston ring in the manner above described and the ring 4 is pressed down against the band spring 10 by virtue of the high gas pressures. Consequently, any oil under the piston ring will tend to be forced out to the cylinder wall. On the up stroke after expansion, the spring 10 will push the ring 4 higher in the groove, thus tending to draw oil in under the piston ring.

It is believed clear that with this construction there will be less piston ring and cylinder wear by virtue of the fact that the high gas pressures cannot get behind the piston ring and also because of the lubrication control, since during the expansion stroke when the piston is pressed down the oil under the ring is forced out to the cylinder wall and lubricates the ring and cylinder contact throughout the stroke.

Figure 9 is a graph of the blow-by in cubic feet per hour plotted against the revolutions per minute, and Figure 10 is a graph of the blow-by in cubic feet per hour plotted against the time after starting.

The tests are believed to be clear from the graphs, and it is readily apparent that the gas seal ring herein described increases materially the sealing effect of the piston ring, and, as a consequence, improvements in engine operation must necessarily follow, and I have here in mind slightly increased power and efficiency and substantially decreased wear.

In Figure 11, I have shown the set-up that was employed to obtain the data plotted in Figures 9 and 10. In this test layout, I employed engine 11 having cylinder 12 and piston 13 reciprocating therein. Attached to closed crank case 14 of the engine is a pipe line 15 leading through a condensation chamber 16 to a gas flow meter 17. Thus the amount of combustion gas blowing by the piston 13 may be determined. As a means for more accurately measuring the amount of blow-by gases, an orifice 18 was drilled through the piston communicating with the space behind the piston ring, as shown in Figure 13. Results of tests using this arrangement are shown on the graphs as "accelerated tests."

In Figure 13, I have shown a somewhat modified form of my basic concept. It will be observed that piston ring 20 is of such width that it is substantially the same width as the groove 3. The inner portion of the ring 20 is cut away to provide angular faces 21 and 22. A seal 23 which is approximately the same in configuration as the seal 5 is adapted to be disposed between the faces 22 of the ring and the upper wall of the groove 3. The operation of this particular gas seal 23 is the same as that of seal 5.

Figure 14:
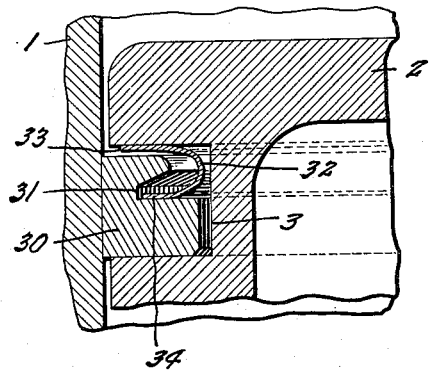
Figure 14 is a fragmental sectional view showing yet a further modified form of gas seal ring.

There is shown in Figure 14 another form of gas seal, and it can be seen that piston ring 30 is of substantially the same width as ring 20. The ring 30 is provided with a cutaway portion 31, and a seal 32 is disposed between the top of the groove 3 and the ring 31. It will be observed that the member 32 is substantially U-shaped and that its resilient leg 33, which bears against the top of the groove 3, is longer than leg 34, which contacts cutaway portion 31 of the piston ring 30.

Figure 15:
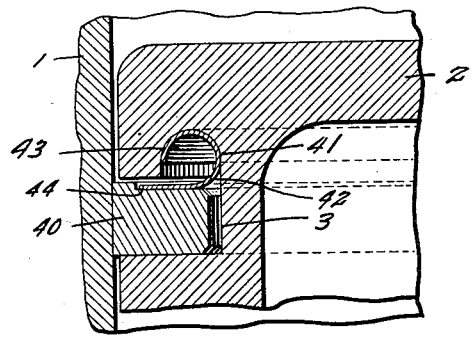
Figure 15 is a fragmental sectional view showing a further form of gas seal ring.

Figure 15 shows a still further form of my invention and, as was the case of Figures 13 and 14, piston ring 40 while of conventional width, there is little clearance between the ring and the walls of the groove. The head of the piston 2 is provided with an annular groove 41 adjacent the inner wall of the groove, and gas seal 42 has one of its ends anchored in the annular groove, as shown at 43. The member 42 has a resilient end 44 that contacts the upper face of the piston ring 40, to prevent the gases from getting behind the ring.

Figure 16:
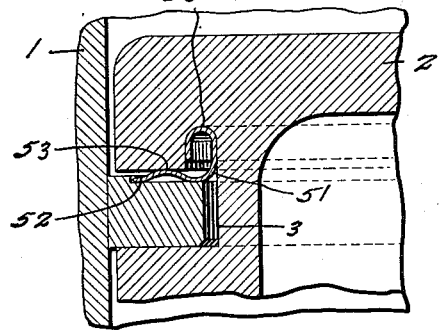
Figure 16 is a fragmental sectional view showing another type of piston ring gas seal.

In Figure 16, I have shown the piston head being cut away at 50 adjacent the inner wall of the groove. One end of seal 51 is attached in the cutaway portion 50. The seal has a flexible portion 52 that is formed with a fulcrum 53 intermediate the anchored end and free end thereof. The fulcrum 53 contacts the upper wall of the piston ring groove and the flexible portion 52 engages the upper face of the piston ring.

Figure 17:
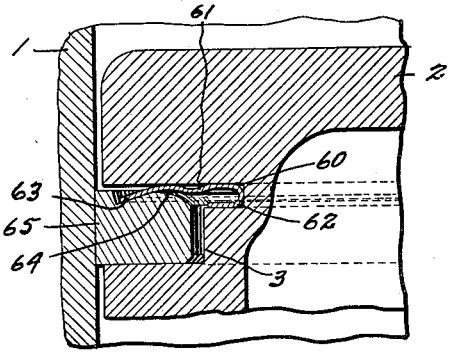
Figure 17 is a fragmental sectional view showing still a further type of piston ring gas seal.

Figure 17 shows another adaptation of the seal shown in Figure 16. In this form, it can be seen that piston ring groove 3 has its upper wall extended to a point beyond the inner wall and it is designated 60. Gas seal 61 is anchored at its inner end in the portion 60 as at 62, and the opposite end is flexible as indicated at 63. The flexible portion 63 engages raised portion 64 of piston ring 65 and a fulcrum 66 is provided between portion 63 and anchored end 62 of the seal.

Figure 18:
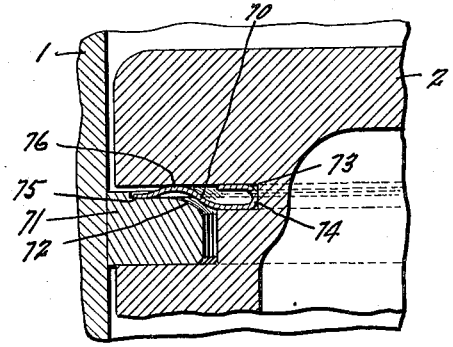
Figure 18 is a fragmental sectional view showing yet a further type of piston ring gas seal.

I have illustrated in Figure 18, a gas seal 70 that is basically the same as the one described with reference to Figure 17. It will be noted that piston ring 71 slopes downwardly towards its inner periphery as at 72. The groove 3 is formed with a recessed area 73 and the seal is secured therein as shown by numeral 74. The seal has a flexible area 75 that contacts the upper face of the ring and fulcrum 76 is provided between the ends of the seal 70. The fulcrum of course engages the upper wall of the groove 3.

From the foregoing description, it is believed readily apparent that I have provided a device whereby gases will be prevented from getting behind the piston ring from the cylinder combustion space. With the particular seals herein described, when the high pressure gases leak down from the combustion space above the piston, they tend to open out the seal and press it more firmly to the piston ring and the top of the piston ring groove. In addition, with my invention it is possible to obtain some lubrication control.

The seal is relatively simple in construction and can be cheaply and easily manufactured. Having the seal formed of thin sheet material completely overcomes the disadvantages that are encountered when these seals are attempted to be effected by means of the machined type of seal.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a piston assembly for internal combustion engines, a cylinder, a piston movable therein, a groove in the piston, a piston ring positioned in the groove, the inner face of said piston ring being cut away to provide angular faces, an annular resilient sealing member having outer peripheral edges between the ring and the groove at an induced initial stress whereby said peripheral edges form uninterrupted annular sealing contact with the ring and the upper wall of the groove, and one peripheral edge of said annular sealing member bearing against one of the angular faces of the piston ring and the other peripheral edge bearing against the upper wall of the groove.

2. A piston assembly for internal combustion engines comprising a cylinder, a piston mounted for reciprocatory movement therein, a groove in the piston, a piston ring mounted in the groove, a cut away portion in the piston adjacent to the groove, an annular resilient sealing member having free edges disposed between the piston ring and the wall of the groove at an induced initial stress whereby said free edges form uninterrupted annular sealing contact between the piston ring and the wall of the groove, and one of said free edges being anchored in the cut away portion and the other free edge being in contact with the upper face of the piston ring.

MELVILLE W. BEARDSLEY.